PERCIVAL M. HEINMILLER,
STEPHEN BARKER,
INVENTORS.

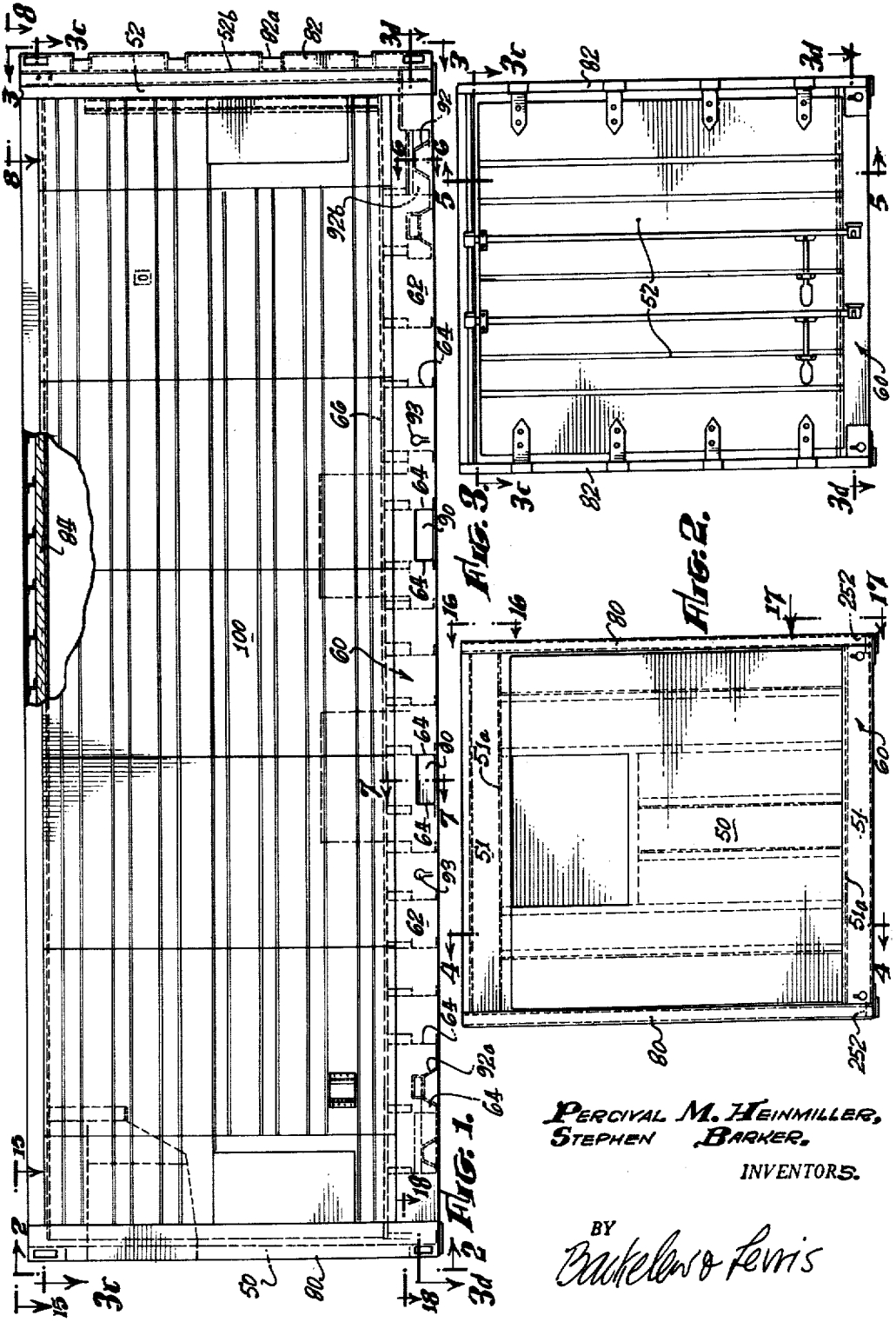

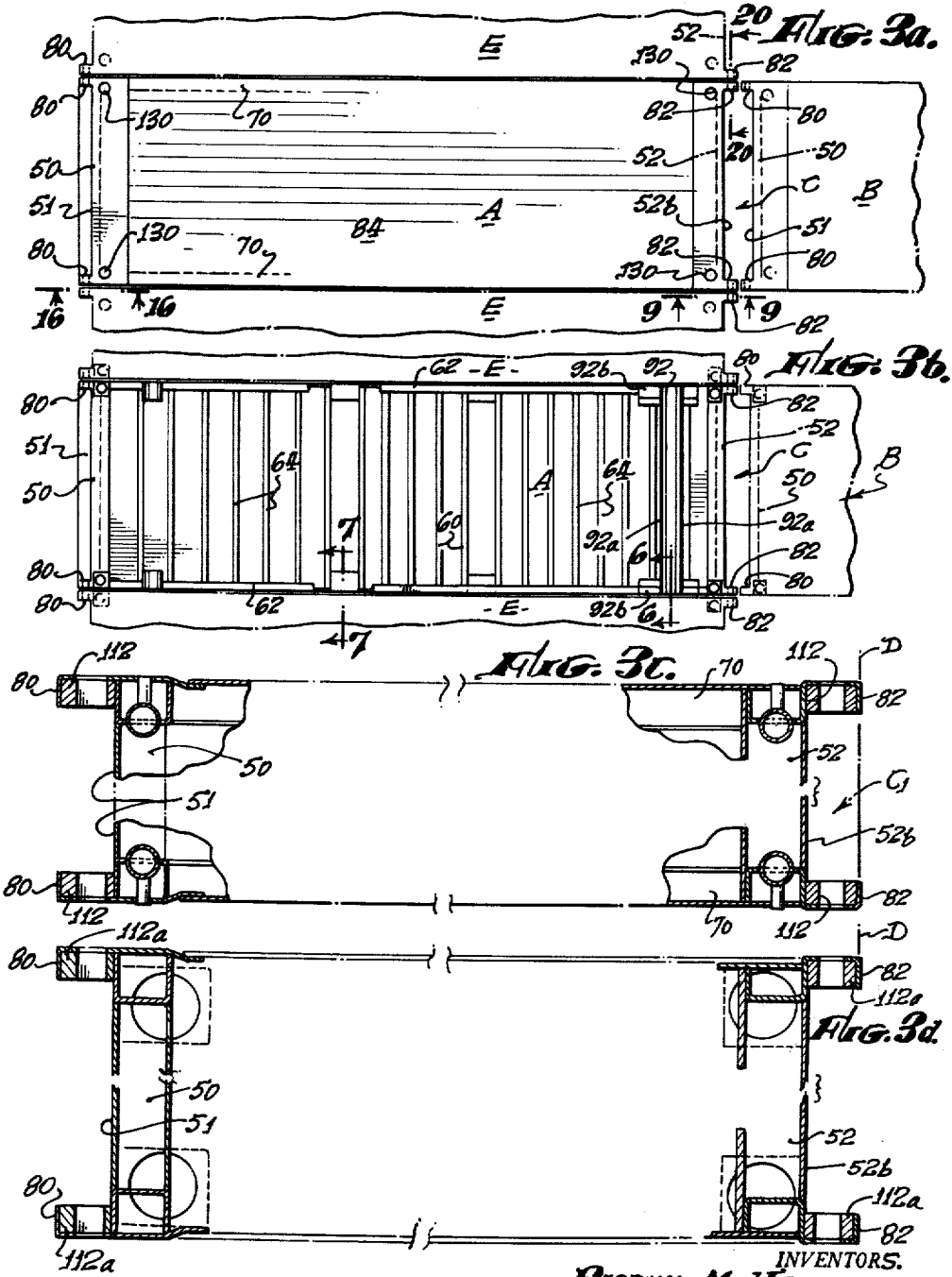

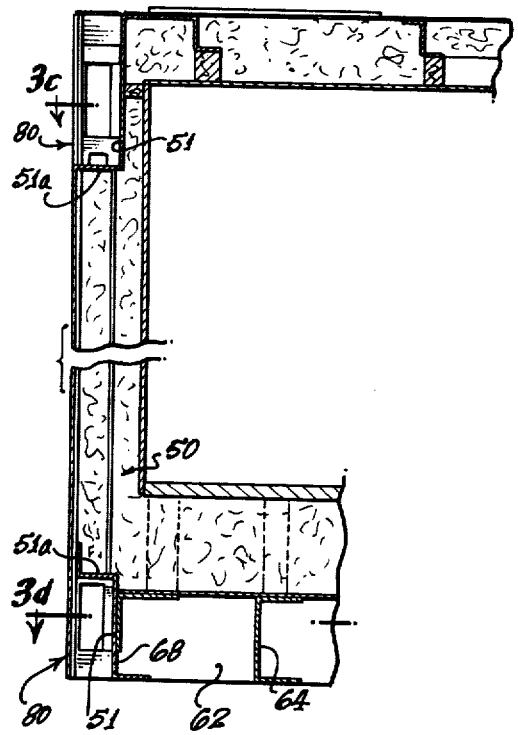
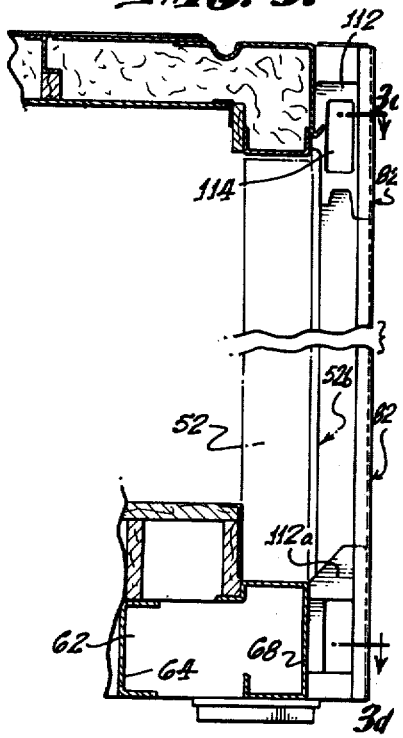
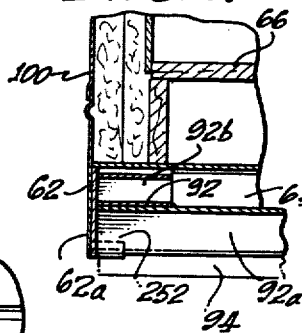
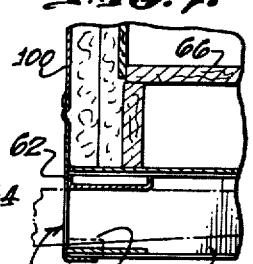
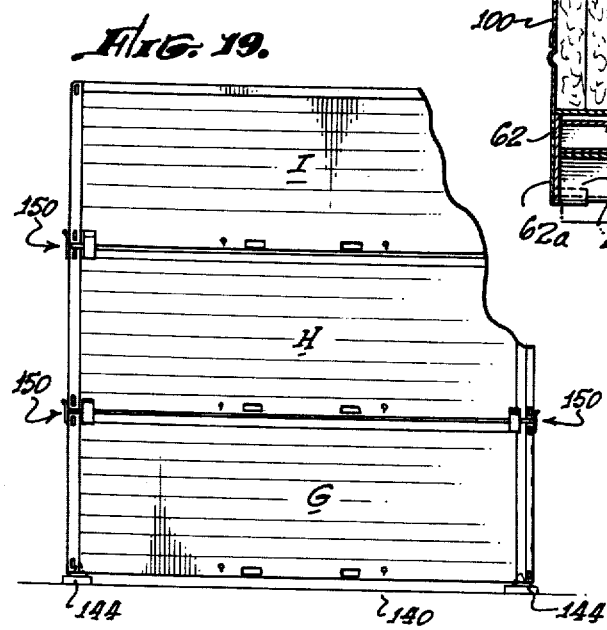

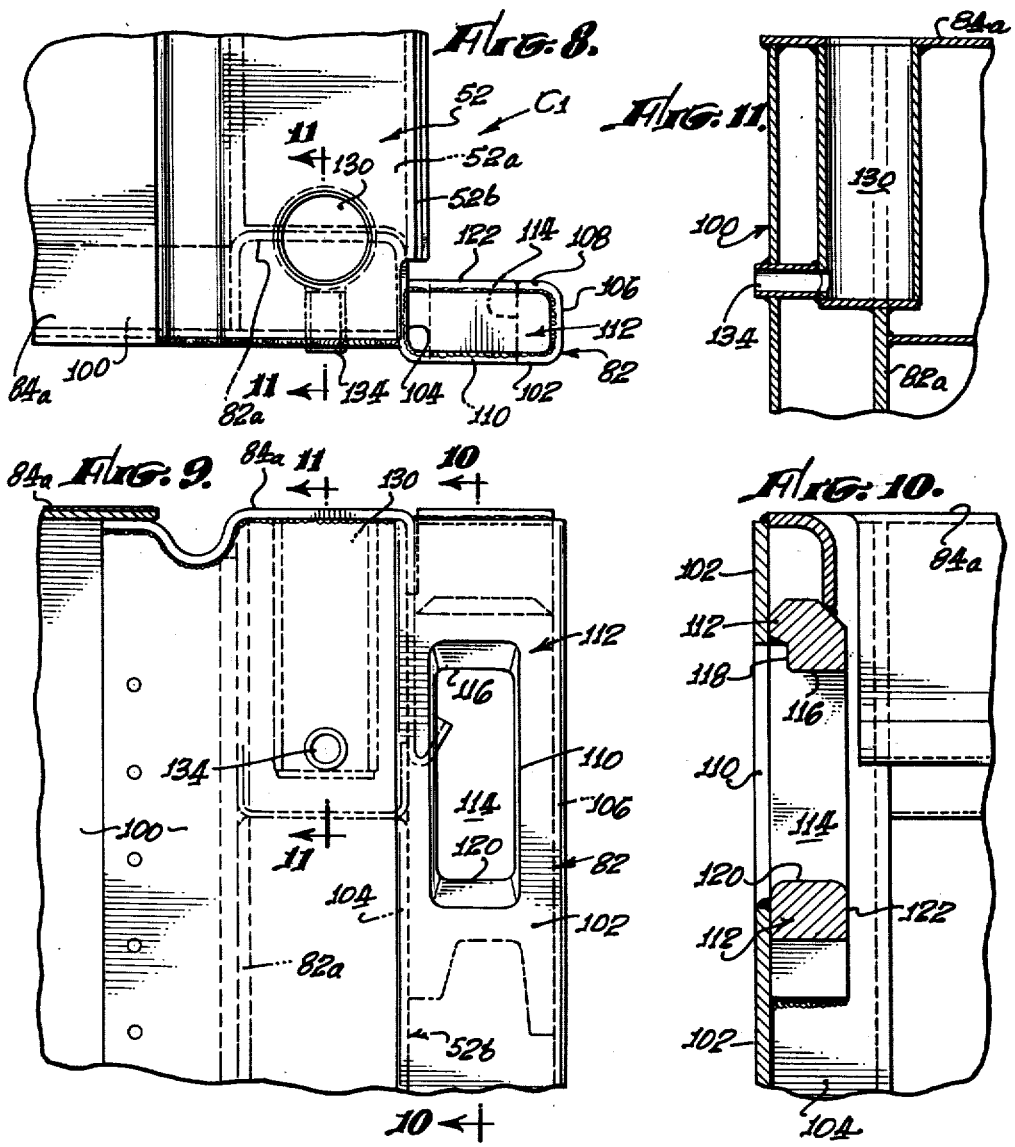

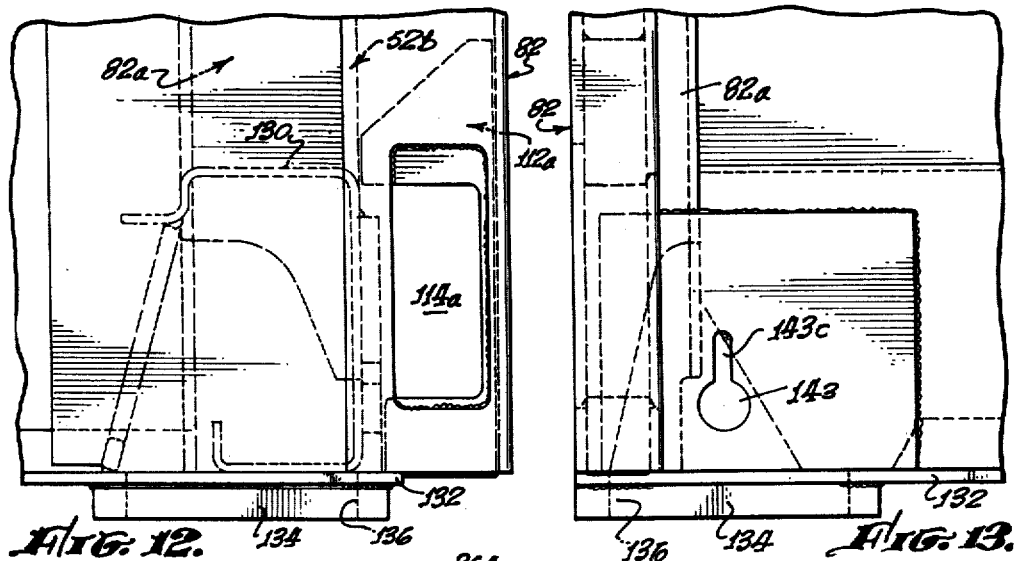
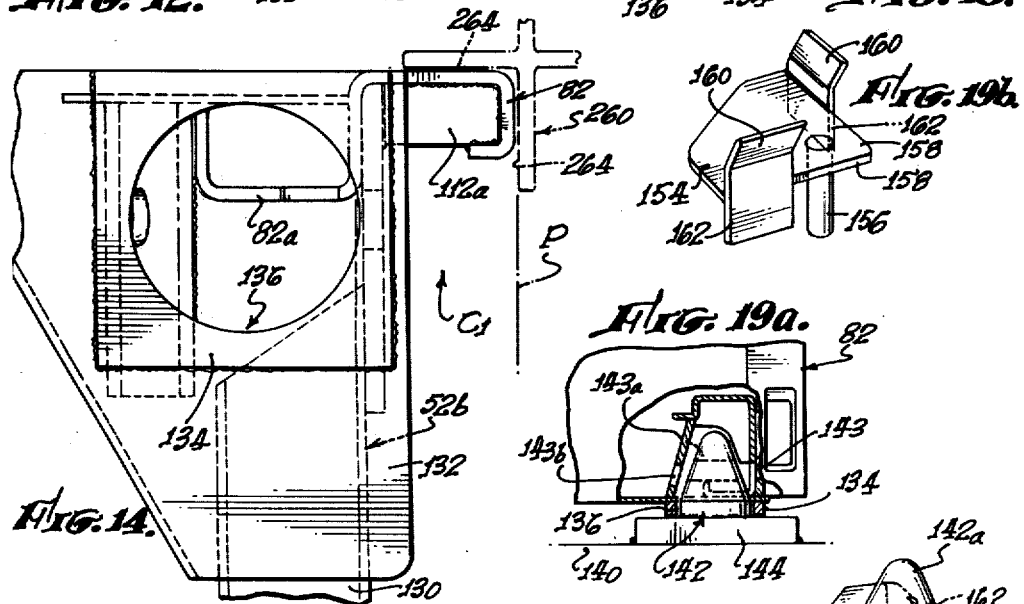
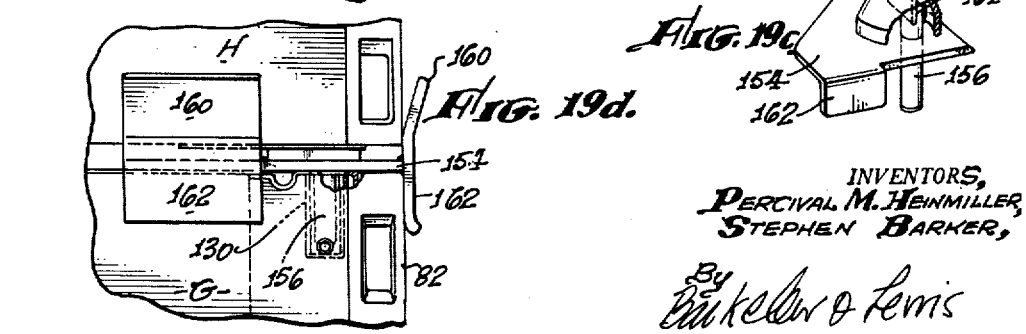

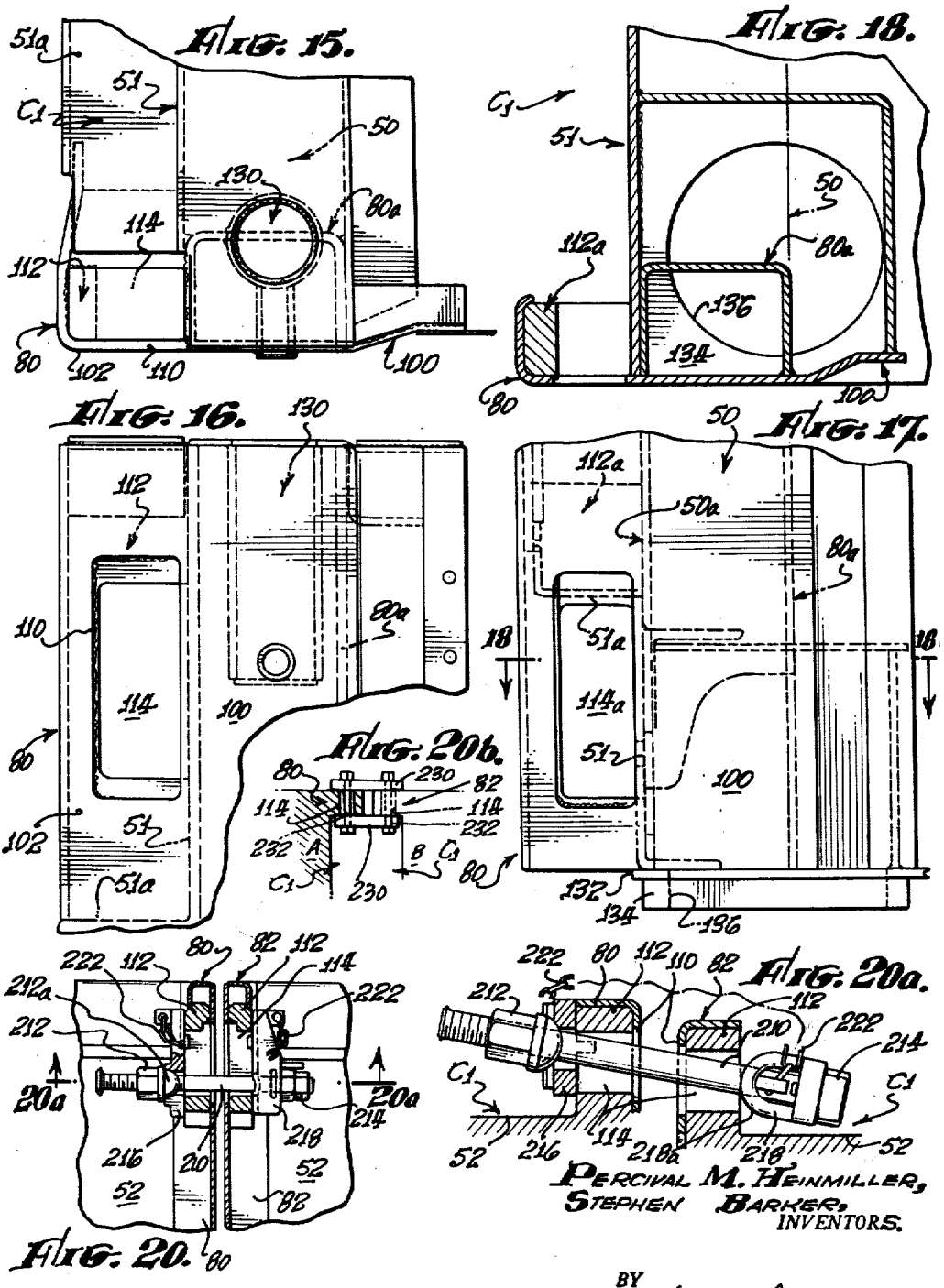

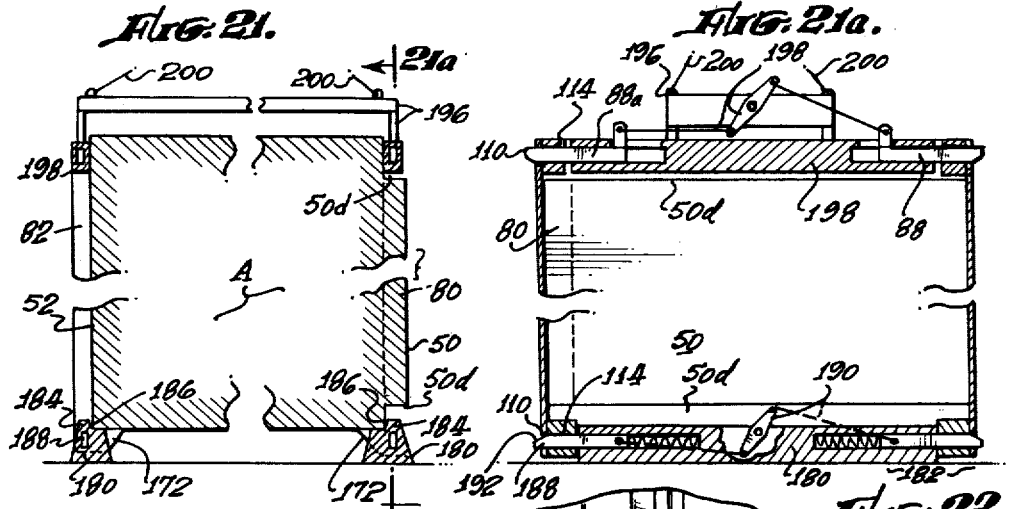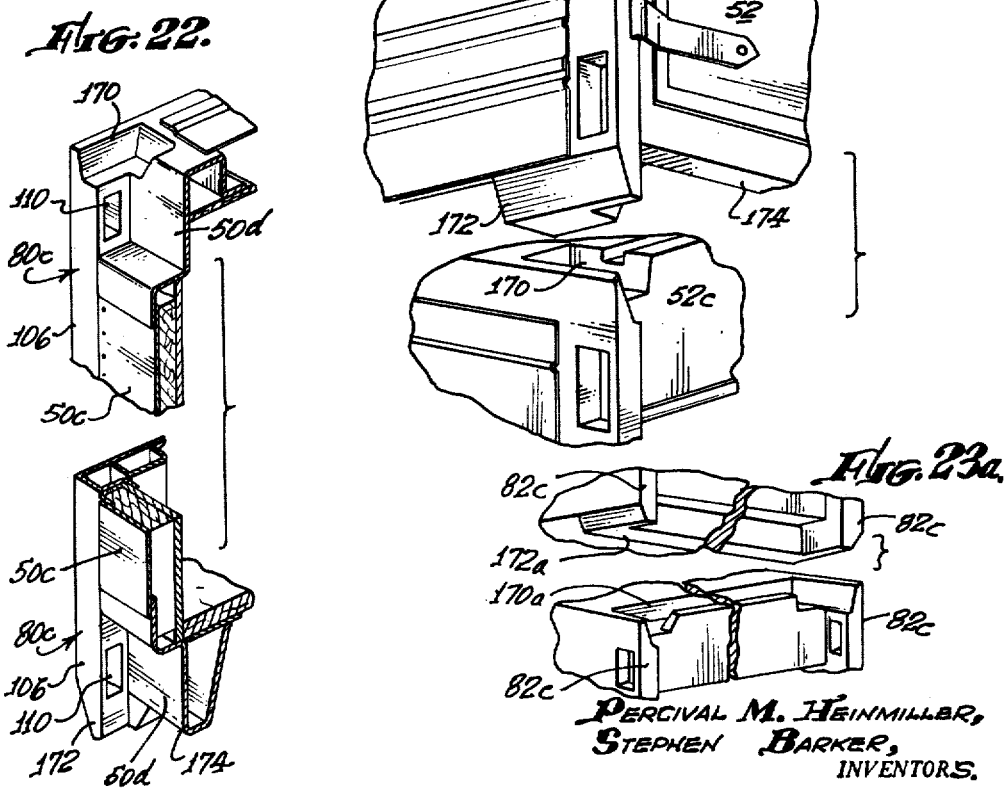

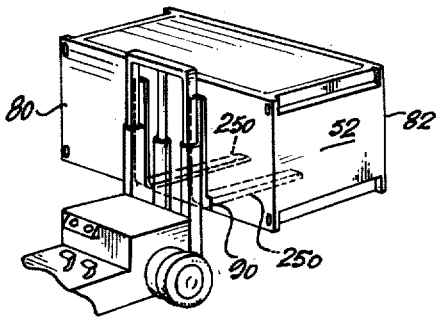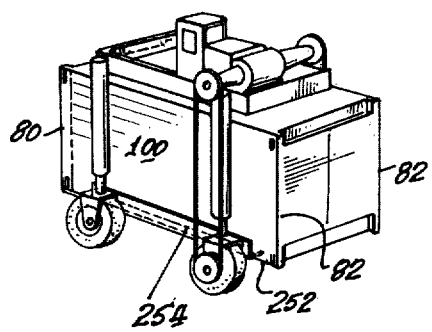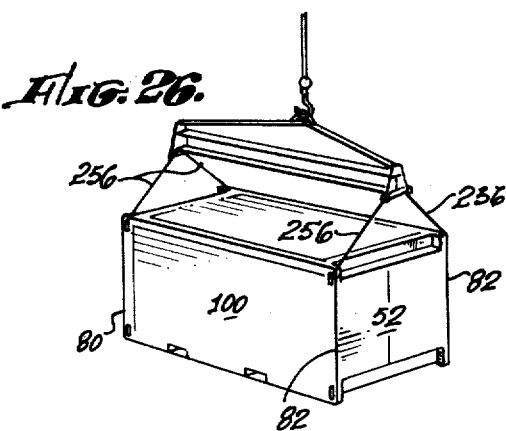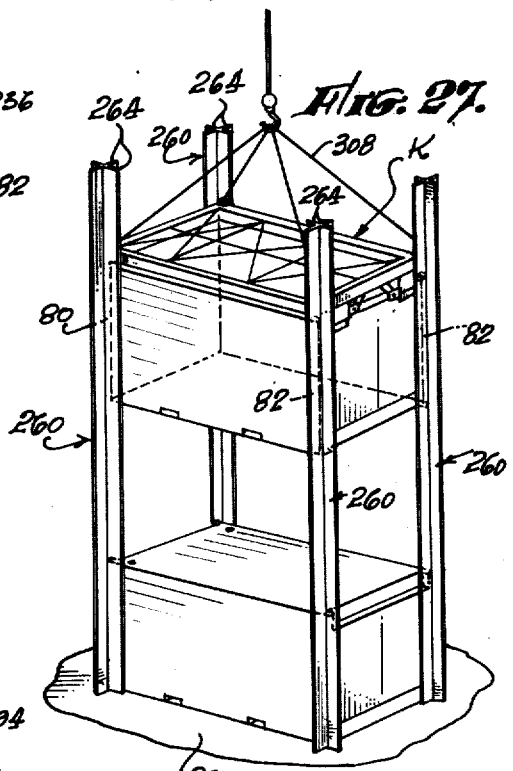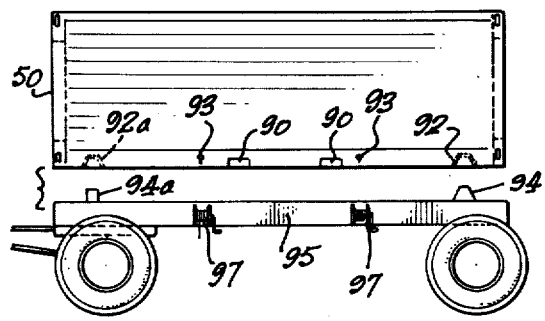

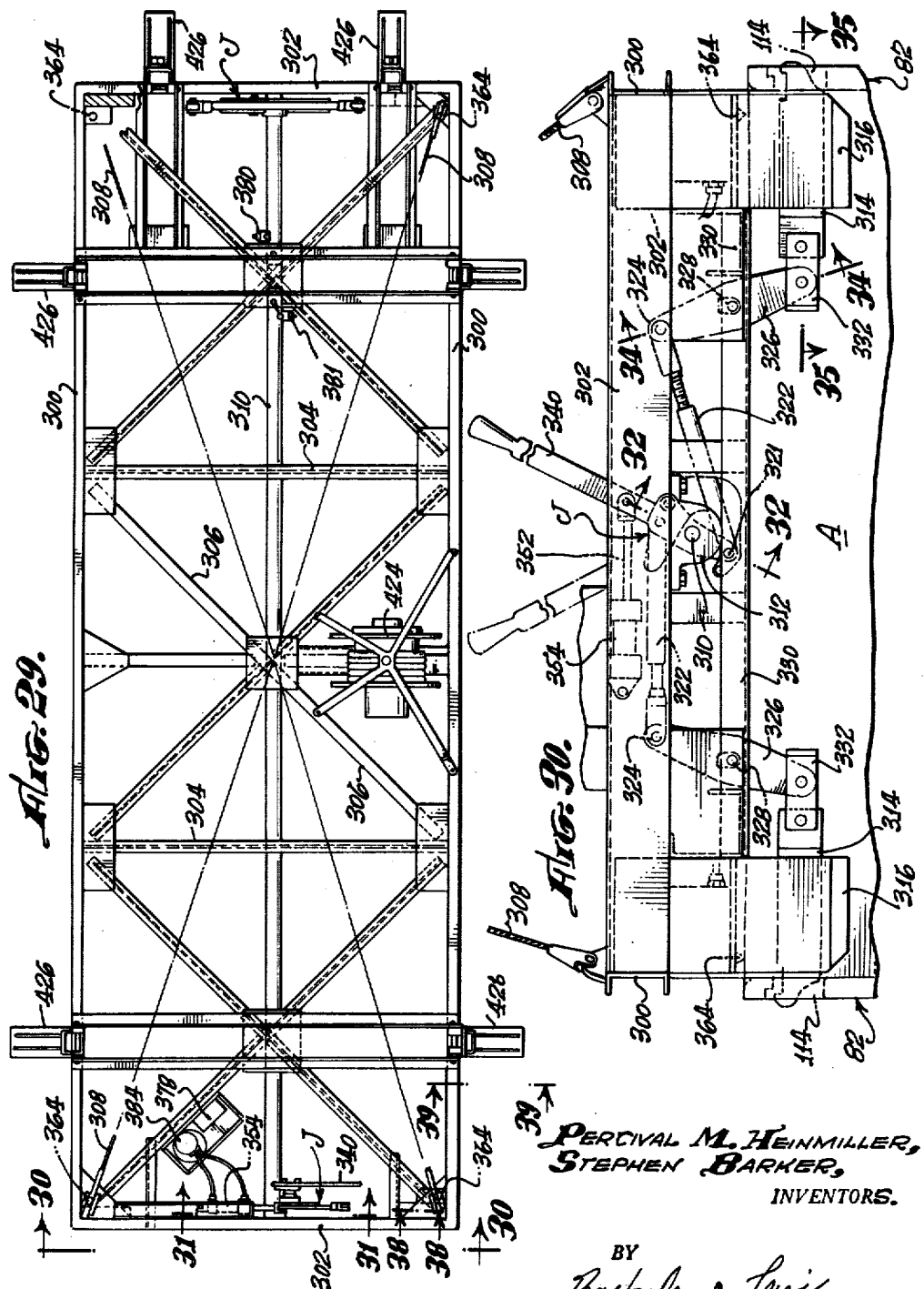

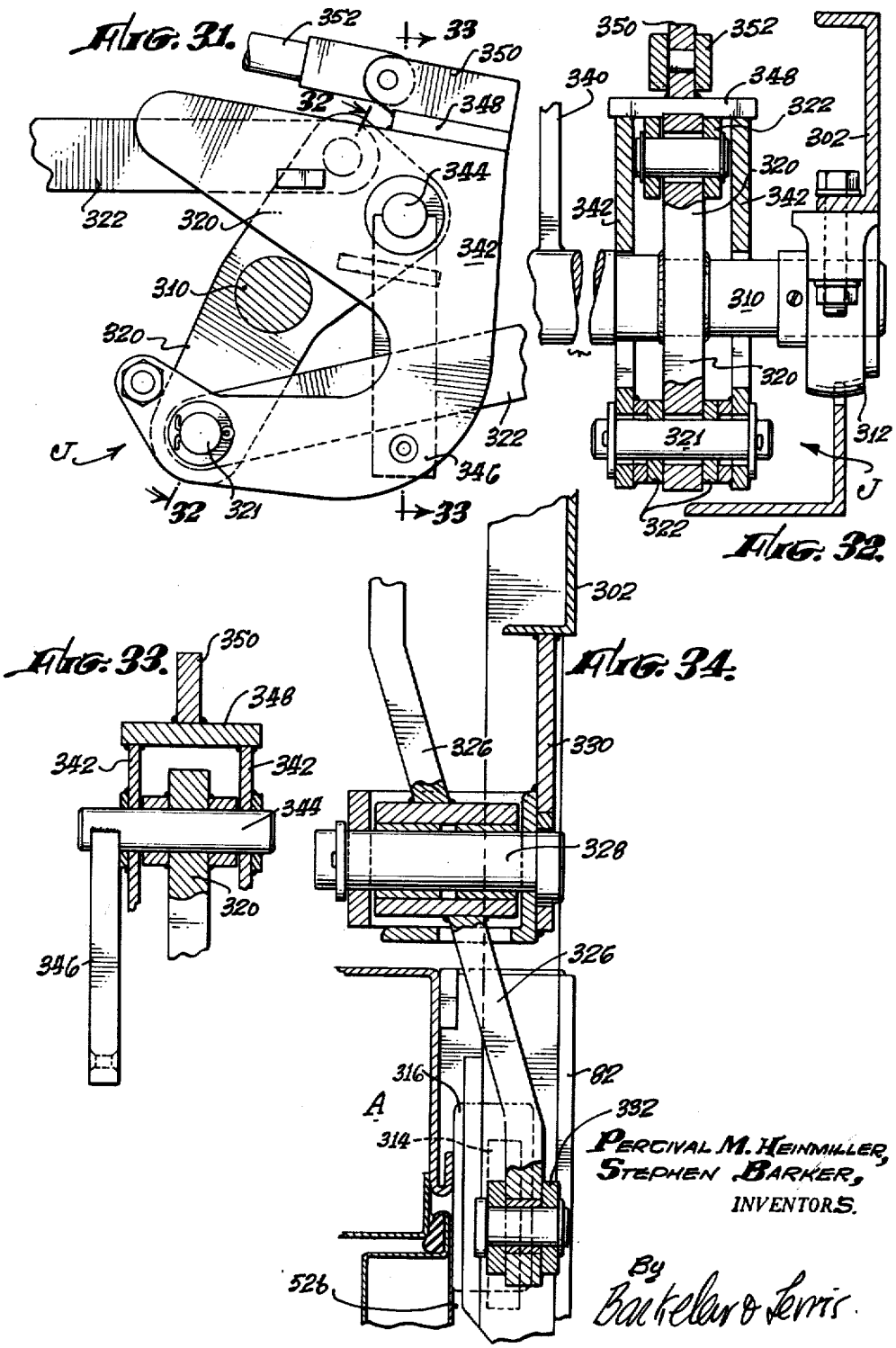

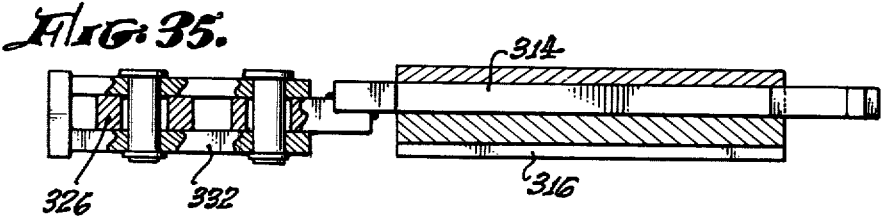
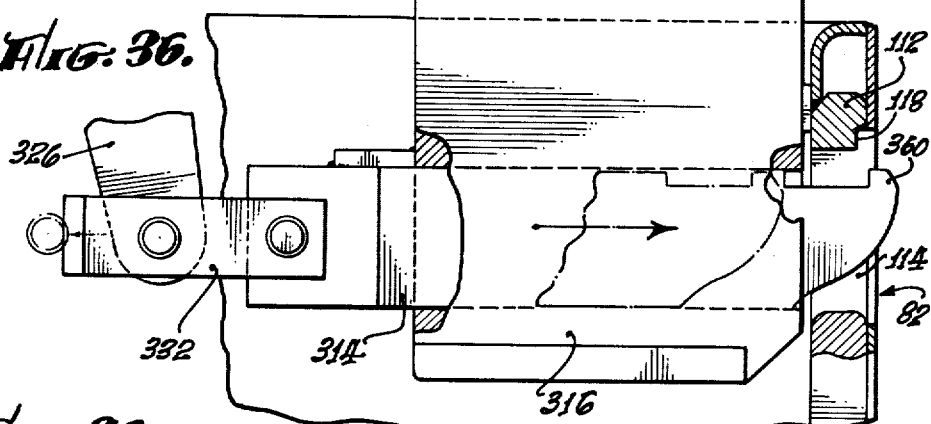
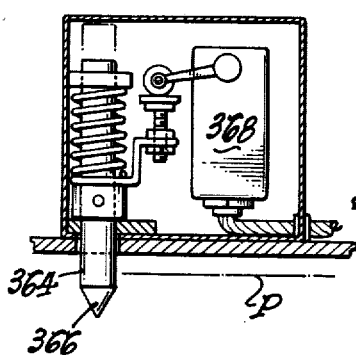
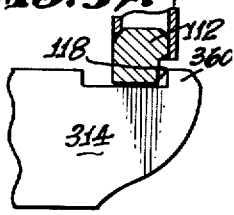
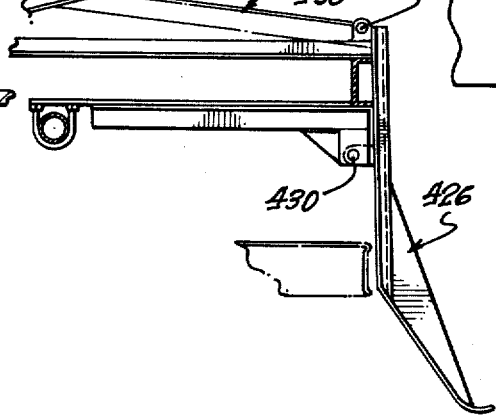

BY
Bakelew & Lewis

United States Patent Office 3,081,120
Patented Mar. 12, 1963

3,081,120
TRANSFERABLE CONTAINERS AND HANDLING SYSTEMS THEREFOR
Percival M. Heinmiller, Pasadena, and Stephen Barker, Temple City, Calif., assignors to Utility Trailer Manufacturing Company, Industry, Calif., a corporation of California
Filed Sept. 17, 1959, Ser. No. 840,606
13 Claims. (Cl. 294—67)

This invention relates generally to transport systems of the so-called piggy-back type—systems in which a goods container is transferred between various carriers such as railroad cars, trucks, trailers, ships, etc. The general purposes and objectives of the invention include the provision of an improved form of container of such design as to be eminently and effectively suited to placement, registration and securing on all common carriers, to be easily and effectively handled, hoisted and lowered, by existing handling, hoisting and/or travelling crane means, and to have no parts liable to interfere with such handling. The invention also includes, in addition to the container itself, certain position-registering and holddown means, position registering and holding means between stacked or juxtaposed containers, and certain hoisting and handling means, co-operating with features of the container to produce novel and highly desirable results.

The container as here illustrated and described is rectangular in general over-all plan, and in elevation. One particular feature of its improved design is its incorporation of smooth vertical columnar structures which spacedly project out horizontally from at least portions of opposite wall faces and which form guiding surfaces and contain means engageable for lifting and/or holding down; and also, in certain forms, means for registering stacked containers. With containers rectangular in form, it is preferred that those vertical columnar structures project outwardly from at least portions of the end walls, and preferably at the corners. That spaced outward projection of the columns, with the walls or wall portions relatively recessed between them, leaves an open operating space between the columns of a pair for free entry of means for locating, anchoring and/or hoisting and handling, regardless of the columns abutting some surface or being guided by the vertical columnar guides that may form a "cell" for a stack of containers on shipboard. One particularly important feature is that spaces or pockets are left for entry of a lifting bridle. The projecting columnar structures contain or carry formations engageable by means entering that open operating space, for the purpose of locating, anchoring and/or hoisting and handling, etc. And, as will be pointed out, automatic mechanism is provided for insuring locking of such anchoring and handling means to the columnar formations; and the locking is also visible for visual checking.

There are many other features of the invention such as the following. The cargo capacity of the container is maintained at virtually the maximum; the anchoring lock-downs and handling apparatus are applied to the four corners where they are most effective; the locking devices for anchoring, handling, etc. are openly visible to give a visual safety check.

Many other features of the invention will appear from the following descriptions of typical and illustrative forms.

The invention, in its various features, will be best understood from the following descriptions of several typical and illustrative forms of containers, means and systems of handling and securing, shown in the accompanying drawings, in which:

FIG. 1 is a side elevation of one form of typical container illustrative of the invention;

FIG. 2 is a front elevation of the container of FIG. 1, and

FIG. 3 is a rear elevation of the same; in the respective aspects of lines 2—2 and 3—3 on FIG. 1;

FIG. 3a is a schematic top plan of the container, showing juxtaposed containers in broken lines;

FIG. 3b is a similar bottom plan;

Figure 40:
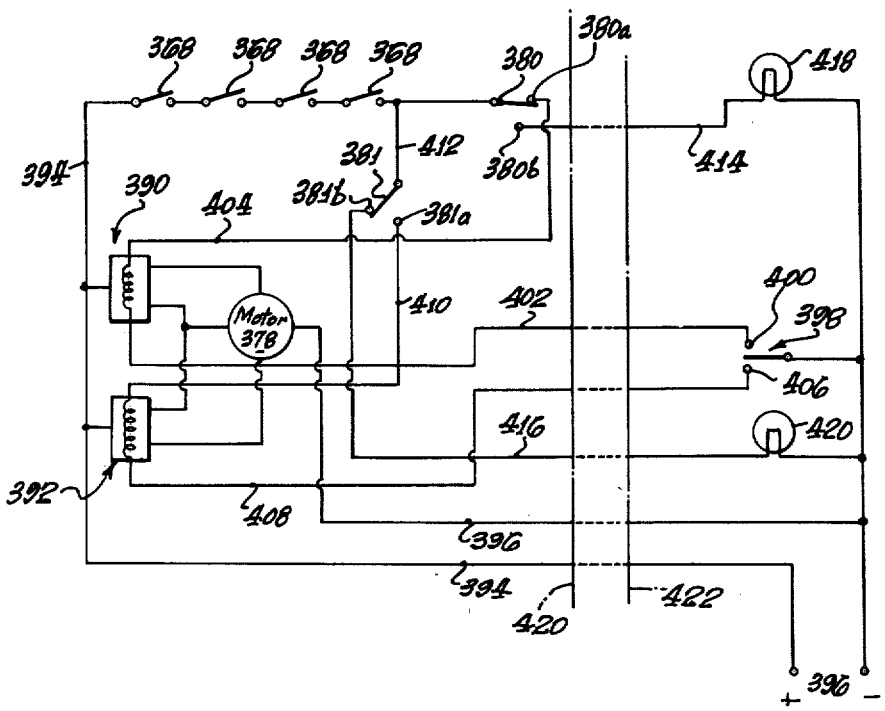

FIGS. 3c and 3d are fragmentary horizontal sections, somewhat enlarged, taken on lines 3c—3c and 3d—3d, of FIGS. 1 and 3 and FIGS. 4 and 5;

FIG. 4 is an enlarged fragmentary longitudinal vertical section on line 4—4 of FIG. 2, showing the structure at the front or left hand end of FIG. 1;

FIG. 5 is a similar fragmentary section on line 5—5 of FIG. 3, showing the structure at the rear or right hand end of FIG. 1;

FIG. 6 is an enlarged detail transverse section on lines 6—6 of FIGS. 1 and 3b;

FIG. 7 is a similar section on lines 7—7 of FIGS. 1 and 3b;

FIG. 8 is an enlarged fragmentary plan of a top rear corner of the container of FIG. 1, taken in the aspect of line 8—8 on FIG. 1;

FIG. 9 is a side elevation, in the same aspect as that of FIG. 1, of the parts shown in FIG. 8;

FIG. 10 is a section on line 10—10 of FIG. 9;

FIG. 11 is a section on lines 11—11 of FIGS. 8 and 9;

FIG. 12 is a side elevation of a lower rear corner in the aspect of FIG. 1, and FIG. 13 is a rear elevation of the same;

FIG. 14 is a bottom plan of the corner shown in FIGS. 12 and 13;

FIG. 15 is a fragmentary enlarged plan of a top front corner of the container, taken in the aspect of line 15—15 on FIG. 1;

FIG. 16 is a side elevation of that corner, in the same aspect as in FIG. 1;

FIG. 17 is a similar side elevation of a bottom front corner, in the same aspect as in FIG. 1;

FIG. 18 is a section on line 18—18 of FIG. 17;

FIG. 19 is a schematic side elevation showing a stack of several containers;

FIG. 19a is a detail side elevation, with parts in section, in the same aspect as in FIG. 12, showing one typical manner of locating and registering the bottom of a container or stack on a supporting floor, platform or other surface;

FIG. 19b is a perspective of one typical form of registration adapted for registering the containers of a stack, and FIG. 19c, a similar view of another typical adapter;

FIG. 19d is a fragmentary side elevation showing such stacking adapters in use;

FIGS. 20 and 20a are detail sections showing one typical method of securing together laterally juxtaposed containers, FIG. 20a being taken on line 20a—20a of FIG. 20;

FIG. 20b is a schematic showing how endwise juxtaposed containers may be secured together;

FIG. 21 is a schematic longitudinal section showing how a container may be located on and between fixed bolsters and how handling and lifting means may be applied;

FIG. 21a is a schematic section on line 21a—21a of FIG. 21;

FIG. 22 is a fragmentary perspective showing an upper and lower front corner structure, in which the stacking-registering means are integral with the container structure, and FIG. 23 is a perspective showing a corresponding bottom and top rear corner;

FIG. 23a is a schematic perspective showing a further modification;

FIGS. 24 to 28 inclusive show various means of handling and locating and securing the containers described herein;

FIG. 24 shows how the containers may be handled by a fork truck, and

Figure 41:
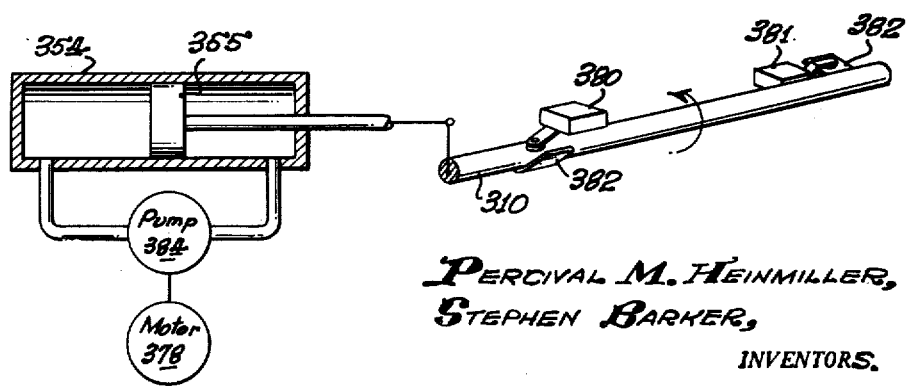

FIG. 25 the handling by a straddle carrier;

FIG. 26 illustrates lifting and handling by simple hoist tackle;

FIG. 27 illustrates schematically the handling of containers in "cell" structures such as may be provided in ships;

FIG. 28 illustrates the location of a container on fixed bolsters on a carrier bed;

FIG. 29 is a plan of a bridle frame and associated parts, designed to engage a container for lifting and handling operations, such for instance as that shown in FIG. 27;

FIG. 30 is an end elevation of the bridle assembly shown in FIG. 29, in the aspect indicated by line 30—30 on FIG. 29;

FIG. 31 is an enlarged sectional elevation of certain parts shown in FIG. 30, taken as indicated by line 31—31 on FIG. 29;

FIG. 32 is a section on lines 32—32 of FIGS. 30 and 31;

FIG. 33 is a detail section on line 33—33 of FIG. 31;

FIG. 34 is a detail section on line 34—34 of FIG. 30;

FIG. 35 is a detail section on line 35—35 of FIG. 30;

FIG. 36 is an elevation, with parts in section, of the parts shown in FIG. 35 and showing initial engagement of a lifting bolt with an aperture of a container column;

FIG. 37 is a detail showing the lifting bolt in full engagement;

FIG. 38 is a detail section on line 38—38 of FIG. 29;

FIG. 39 is a section on line 39—39 of FIG. 29;

FIG. 40 is a diagram of an electrical control system for the bridle device of FIG. 29 and following; and FIG. 41 is a schematic showing of part of the control system.

In the following, but merely for convenience of description, the end of the container at the left in FIGS. 1, 3a and 3b, will be referred to as the front, and the right hand end as the rear. The structures at the front and rear are essentially the same, with the mere difference, that as shown here, the front partially recessed end wall 50 is solid in the structure while the wholly recessed rear end wall 52 is formed of hinged doors. It is, however, within the purview of the invention that access openings may be located anywhere desired, and accordingly the rear end doors 52 will here be referred to simply as the recessed rear end wall. In detail, the wall structures of the containers are shown here as double walled with intervening heat insulation; this particular container having been designed for carrying refrigerated or cooled commodities. That, and various other such details and provisions are not to be taken as limitations of the invention.

As shown more or less schematically in FIGS. 1 to 3d the illustrated container has a bottom floor structure 60 which embodies longitudinal beam members 62 carrying transverse members 64 supporting a floor 66; the longitudinals being joined at their ends to end transverse beams 68 (see FIGS. 4 and 5). The end walls 50 and 52 are carried on those end transverse beams 68 (or, in the case of rear end wall 52 formed of doors) on the side wall structures 70 or on the corner columns that are rigidly joined to the side and end wall structures as shown in other figures, and more particularly in the sections of FIGS. 4 and 5.

As shown more or less schematically in FIGS. 1 to 3d, the structure includes two vertical columns 80 at the two front corners projecting forwardly beyond the outer face of the recessed parts 51 of front wall 50, and two similar vertical columns 82 at the two rear corners projecting rearwardly beyond the outer face 52b of rear wall 52. Thus, as is clearly shown in these and other figures, the front and rear walls 50 and 52 are recessed either wholly or partially behind the corner columns 80 and 82. Thus, if two containers, such as those shown at A and B in FIGS. 3a and 3b, are juxtaposed longitudinally with their corner columns in mutual contact, an open space C is left between the recessed portions of end walls 50, 52 for free entry of lifting and handling and/or hold down tackle such as will be hereinafter described. Or if the end columns are abutted against any surface, such as that indicated by the line D—D in FIG. 3c, there is still left a free space C1 between the columns available for any such purpose. Or, if adjacent containers are juxtaposed side to side, as indicated in FIG. 3a by containers A and E, the space C or C1, between their respective columns provides for easy access to shackling means applied to their abutting columns, as will be later explained. The same is true if it is desired to shackle together the columns of endwise abutting containers such as A and B in those figures.

The columnar structures at the four corners are essentially duplicates, varying only in detail, due mainly to the fact that rear wall 52 is here formed by doors. (The notches that appear in FIG. 1 at 82a in rear columns 82 are merely to accommodate hinges for the rear doors.)

The container may or may not have a full roof structure, such as shown at 84; and, as matter of fact, it may or may not have full height side and/or end walls. It may, in effect, be essentially a platform or floor structure with side and end walls of partal or full height, with the four corner columns as described.

The floor structure 60 (see FIGS. 1, 6 and 7) has openings at opposite sides at 90 in the longitudinal underfloor beam structure 62 for insertion of a fork lift as illustrated in FIG. 24. These openings, registering with spaces between transverse beams 64, provide open passages extending clear across the underfloor structure for such fork lifting.

The longitudinal beam structure 62 at each side also has downwardly opening recess or socket formations 92, shown in FIGS. 1 and 6, internal of the outer beam flanges 62a. These recesses, also aligned with spaces between transverse beams 64, and closed as they are at their outer ends by flanges 62a, provide both longitudinal and lateral locating means for a container by its being lowered over such transverse bolsters as 94 such as shown in FIG. 28 and in broken lines in FIG. 6. The container may then be held down on the bed 95 of a truck or other carrier by such means as tackle hooked into side wall openings 93 and tensed by winches 97.

One of the openings 92, as the one shown at the rear in FIGS. 1, and 28, tapered upwardly in cross-section, may be structurally walled cross the bottom of the floor framing, as indicated at 92a in FIGS. 3b and 6. And that wall structure may be solidly affixed to the side beams 62 by secured blocks such as indicated at 92b in FIGS. 3b, 1, and 6. Such a bolster as 94 of FIG. 28 may then be shaped to fit that opening 92 tightly; and the other bolster, 94a of FIG. 28 to fit the opening 92a with clearance. Longitudinal thrusts will thus be transmitted to the container framing through the bolster 94 and its reinforced walled socket 92. And the container framing may then be designed to transmit such thrusts longitudinally to, and reinforcedly support the end wall at the opposite end (here shown as the front wall 50).

In general, it is to be noted, without necessity of repetition, that the entire container structures as here shown are symmetric with respect to a central longitudinal axis, so that the showing and description, of for example, one corner column and its surrounding and connected structure applies also to its laterally opposite counterpart. Also, without necessity of repetition, it will be understood that all adjacent, adjoining or abutting parts of the structure are rigidly secured together, as by welding, for example—excepting only the swinging doors that form part of the rear end wall.

As here shown, see particularly FIGS. 4 and 5, rear end wall 52 is shown with its outer face 52b recessed from top to bottom behind the rear corner columns 82. This type of whole recessing is, in this particular design, due to the fact that the rear wall is composed mainly of doors. On the other hand, that rear wall could be solid, and either wholly recessed to the outer face 52b as shown, or it could then be recessed over only its upper and lower parts, as is here shown for the front wall 50. Like the rear wall, the front wall can be wholly recessed; but it is preferred to only partially recess any solid end wall. Thus, as most clearly shown in FIG. 4, the solid front wall 50 is recessed only at top and bottom at 51. Those recesses extend horizontally across the whole face of the wall between the opposing columns 80, as shown in FIG. 2 where the recess defining shoulders 51a are also shown. These limited recesses, as will appear, are made large enough in vertical dimension to take the various locating and hold-down bolsters and the lifting and handling devices described later. The limited partial recessing of a wall or walls does not reduce the interior cargo space, as FIG. 4 clearly shows; merely reducing the wall thickness over the limited areas of the recesses.

FIGS. 8 to 10 show, by way of example, the illustrative structure at a top rear corner, FIG. 8 being an enlarged fragmentary plan in the aspect of line 8—8 on FIG. 1, and FIG. 9 being a side elevation of those upper corner portions, in the same aspect as that of FIG. 1. The upper end of the rear corner columnar structure is shown generally at 82 formed integrally with a vertical columnar formation 82a which forms a rear end member of side wall 100, and may also form part of the rear wall 52 which is mainly formed of the doors 52a. FIG. 8 shows clearly the recessing of the outer face 52b of that end wall 52 behind the outer faces of the columns 82, showing how those columns project beyond that face.

The hollow columnar structure 82 is formed with a web 102 in an outer vertical plane substantially co-planar with the outer face of side wall 100, and with two inwardly projecting flanges 104 and 106, the latter having a narrow reentrant flange 108 at its inner edge. The outer web 102 has an opening 110 near its top, preferably of vertically elongate rectangular form as shown in FIG. 9. Welded within the hollow column is a block 112 with an opening 114 extending through it in alignment with column opening 110. As shown more particularly in FIG. 10, block opening 114 has an upper edge wall 116 dropped below the upper edge of opening 110, and there is a vertical face 118 at the outer edge of wall 116. The lower end defining surface 120 of opening 114 is rounded at its outer and inner edges to facilitate latch entry. Block 112 is welded all round to the column and preferably formed of some hard and tough metal such as cast steel. Its opening 114 is preferably somewhat smaller than column opening 110, both in height and width, as shown in FIG. 9. At the block's inner face 122 its opening 114 opens into the space C1 between the opposing columns 82. Blocks 112 are provided to take handling and hold-down tackle, as will hereinafter appear, when the reasons for the shape of opening 114 will be described. The downwardly facing wall 116 at the top of opening 114 is means located in the columnar structure engageable by projectible elements on the container lifting means hereinafter described. The engageable means associated with each of a pair of columnar structures present substantially horizontal, vertically engageable surfaces in substantially horizontal opposition that open to or are accessible from the mutually opposed faces of the pair of columnar structures.

As shown in FIG. 3a and more particularly in FIGS. 8 and 11, each upper corner of the container structure has a walled opening 130 leading down from the upper face 84a of the structure. The purpose of these openings is to provide, in combination with complementary elements associated with the under face of another container, registering means for stacking. Such complementary elements may be integral with the under faces of the containers, as will be later explained, and the openings 130 may be of various forms. One such form is shown in FIGS. 8 and 11, where the walled opening 130 is cylindric in form, with a drain passage 134 at its lower end.

FIGS. 12–14 show a typical structure at a lower rear corner, with the lower end of a rear column 82. In this structure, the insert block 112a and its opening 114a are in substance the same as 112 and 114 in FIGS. 8–11, and its relations to column 82 and recess space C1 are the same. FIGS. 12 and 14 again show the recessed relation of rear outer wall surface 52b to the column. They also show the transverse beam 130 that forms the lower part of the rear wall; a bottom corner plate 132 and a foot plate 134 with an opening 136 which may be utilized, as later described, for stacking registration or for locating the container on any surface.

It may be noted here that foot plate 134 is directly under the lower end of corner columnar structure 82a, and that, in a stack of containers, a foot plate 134 will be directly over the upper end of such corner columnar structure, such as shown in FIGS. 8 to 11. This arrangement is essentially the same at all four corners of the container. Consequently the load of upper containers in a stack, transmitted only at the corners (as through foot plates 134) is carried essentially by the columnar structures such as 82, 82a and the integrated external columns such as 82, 82a of the containers below.

FIGS. 15 to 18, show a typical structure at upper and lower front corners, FIG. 15 being a fragmentary plan in the aspect of line 15—15 on FIG. 1, and FIG. 16 being a side elevation of the upper corner parts of FIG. 15 in the same aspect as in FIG. 1, FIG. 17 being a side elevation of the lower corner parts in the same aspect as in FIG. 1, and FIG. 18 being a horizontal section on lines 18—18 of FIGS. 1 and 17.

The upper corner structure shown in FIGS. 15 and 16 is in all essentials the same as the rear upper corner structure shown in FIGS. 8 to 11. Column 80 also has a vertical outer web 102 with opening 110, backed by the opening 114 in insert block 112; that block and its opening being the same and bearing the same relations to the column, its opening and the recessed space C1 between the two opposing columns 80. The recessed outer face of front wall 50 is indicated at 51. Column 80 is, like column 82, formed integrally with a columnar structure 80a that forms part of the structure of side wall 100 and end wall 50. The upper walled registering opening 130 is the same as described for FIGS. 8 and 11 and bears the same relation to the upper end of 80 and 80a.

The lower front corner structure is shown in FIGS. 17 and 18. The insert block 112a in the lower part of column 80, its opening 114a, and their relations to the other parts and the inter-columnar space C1, are the same as described in connection with FIGS. 12 to 14 for a lower rear corner. There is the same bottom corner plate 132 and foot plate 136 in the same relation to the lower end of column 80a for performing the same services as those parts in FIGS. 12 to 14.

It will be noted that the corner plates 132 (see FIGS. 12–14 and FIG. 17) have their outer edges substantially coextensive with the outer side and end-wall corners of the container body. Foot plates 134 have their outer edges similarly substantially coextensive.

FIG. 19a illustrates one means of locating a container on a supporting surface by engagement with the foot plates 134. In that view 140 designates any supporting platform, such as the floor of a truck or trailer, a railroad car, the deck of a ship, etc. A locating pin 142 with a cylindrical lower and a tapered upper portion is shown as mounted on a suitable base 144. When a container is lowered onto such pins and bases the tapered upper ends of the pins enter the openings 136 in foot plates 134, guiding the foot plates down onto the lower cylindrical portions of the pins, which fit openings 136 loosely. The foot plates 134 then rest on the bases 144 to support the container. The container may then be held down, if necessary, by any suitable or available means. A holddown pin may be inserted through the opening 143 (see FIG. 13) and through opening 143a in pin 142 and opening 143b in the body structure surrounding pin 142. Such a holddown pin may have a projecting lug that is initially inserted through the part 143c of opening 143, and then after full insertion turned down inside the part which has the opening 143b. Other methods and means for locating and holding a container on a supporting surface will be later described.

Methods and means of registering the containers of a vertical stack, such as shown schematically in FIG. 19, will now be described. In that figure a lower container G is, for example, shown as located on supporting surface 140 by means at its four corners like those shown in FIG. 19a; and two containers H and I are shown stacked on G and registered with it and each other by adapter devices 150 at the four corners. Such adapter devices are shown in FIGS. 19b and 19c, and that of FIG. 19b is illustrated in use in FIG. 19d.

In FIG. 19b a plate 154 has a depending pin 156 secured to it. Two edges 158 of the plate carry rigidly attached guide lugs with portions 160 projecting above the plate and portions 162 below the plate. The relation of pin 156 to the lower lugs 162 is such that the pin will enter an upper register opening 130 in the upper face of a container such as G with lugs 162 bearing one against the side surface of that container and the other against an end surface, such as the end surface of the column 82, as shown in FIG. 19d. Pin 156 preferably fits opening 130 loosely and the lugs need not bear directly on the container surfaces, but only closely enough to align with the container. In that position, lugs 160 are positioned to receive the corresponding corner of a container such as H, and to bear against its side and end faces to hold the stacked container in register with the one below. In such manner any number of containers of a stack may be held against any substantial horizontal displacement relative to a bottom container which can be held against horizontal displacement in a number of different ways.

FIG. 19c shows a variant form of registering adapter with plate 154, depending pin 156 and the two depending lugs. Instead of the upper lugs 160, this adapter has a pin 142a, like 142 of FIG. 19a, adapted to enter the aperture in a foot plate 134 of a container lowered upon it. The resultant function is the same as above described.

The registering adapters of FIGS. 19b and 19c have been described as separate elements which may be applied to and between stacked containers as desired. However such registering means may be secured to a container to be an integrated part of its structure. For example plates 154, of, say, the form of FIG. 19b may be secured under the four corners of a container, in the position shown in relation to container H in FIG. 19d. In that fixed position pins 156, projecting below the lower face of the container, will enter the registering openings 130 of a stack, and they also then provide and act as corner feet to support the container on a platform.

Another, and preferred form of such supporting feet that act as registering pins, is shown schematically in FIGS. 22 and 23. In those figures, 50c and 52c are, respectively, the front and rear end walls of a modified container, and 80c and 82c are front and rear corner columns. At the top of each corner column a rectangular recess 170 with downwardly tapering walls is integrally formed in the structure. At the bottom of each corner column a downwardly tapering foot 172, also formed integrally in the structure, projects below the lower surface 174 of the container, these four feet being positioned to enter the recesses 170 to register an upper container on a lower one.

Feet such as 172 need not be restricted to the container corners, but they and the corresponding recesses may extend clear across the container between the corner columns. Such is shown schematically in FIG. 23a where the feet 172a are indicated extending across between columns 82c, and recess 170a is shown correspondingly extending. This arrangement gives greater load-bearing area.

FIG. 22 also shows again that the end walls, such as the front wall 50c shown in FIG. 22, need not be wholly recessed, over their whole surfaces, behind the outer faces 106 of the columns, such as those shown at 80c or at 80 or 82 in other figures. As shown, for example at 50d in FIG. 22, these walls need only be so recessed in their upper and lower portions, opposite the upper and lower column openings 110. Such limited recessing still serves the purpose of allowing entry of handling tackle and/or hold-down means between the opposing column pairs, and access to shackling to hold adjacent columns together, as will appear.

FIGS. 21 and 21a are schematics showing how lifting and/or hold-down and registering tackle may enter the recessed spaces between opposing columnar structures. In these figures the body of a container is diagrammatically indicated at A, with one end wall 52 fully recessed behind columns 82, and with the other end wall 50 only recessed at top and bottom, as previously explained. Registering bolsters 180 are shown mounted on a bed 182 which may represent the supporting floor or platform of any carrier. These bolsters, extending transversely of, say, a truck or trailer bed, are spaced longitudinally with relation to the length of the container, as shown in FIG. 21, so that their transverse lengths, as shown in FIG. 21a, will enter between the lower ends of opposing columnar structures 80 and 82 as the container is lowered into position on the support. In that position, the container may rest on its feet, such as those shown at 172, or may rest on the bolsters. In either case, the bolsters have upstanding flanges 184 with interior sloping faces 186 that serve to guide the container down and confine it endwise by bearing, more or less closely, against the bottom edges of the end walls, as indicated in FIG. 21.

Each bolster carries a pair of endwise projectible and retractible latch bolts 188 shown here as spring-pressed outwardly and retractible by the system shown diagrammatically at 190. The outer ends of the bolts have beveled upper faces 192, so that they will be pushed inward as the lower ends of the columns come down on them, and then be automatically sprung out into the hold-down apertures 110, 114 of the columns as the containers come to rest in such a position as shown in FIG. 21.

FIGS. 21 and 21a also show, in simple diagram, a lifting and handling tackle with a frame-work shown schematically at 196 carrying two transverse spreaders 198 spaced longitudinally in the same manner as the bolsters, and of such lengths as to enter between the upper ends of the spaced opposing columnar structures 80 and 82. Like the bolsters, these spreaders carry projectible and retractible bolts 188a adapted to be projected outwardly into the upper column openings 110, 114 as shown schematically in FIG. 21a. These bolts may be projected and retracted either manually, or under suitable controls as explained later. They are here diagrammatically shown as operated by the simple system 198 carried on frame 196. Hoisting and handling means, simply shown here at 200, of any suitable type may connect with the frame.

It has been remarked that the wall recessing between the opposed columnar structures of each pair not only facilitates entry of handling and or hold-down means, but also facilitates shackling together two or more juxtaposed containers, such as those shown in FIGS. 3a and 3b. when juxtaposed laterally as shown for containers A and E on those figures, the columnar structures 80 and/or 82 abut or approach each other in the positional relation shown in those figures, and in larger detail in FIGS. 20 and 20a. FIG. 20 is a detail view, taken, for instance, in the aspect indicated by line 20—20 on FIG. 3a showing two columns (they may be either 80 or 82). In these views the recessed end walls are indicated at 52. In laterally juxtaposed position the openings 110—114 of the columns are more or less aligned, as shown in FIGS. 20 and 20a. They may then be secured together by such a shackling means as shown in those figures. As there shown, a bolt 210, preferably smaller in size than openings 114, has adjustable and settable nuts 212 and 214 which set clamping members 216 and 218 up against the inner faces of columns 80, 82 (or of their inserted blocks 112) to draw and hold the columnar structures together. As here shown in preferred detail nut 212 bears on clamping member 216 via a spheric element 212a; and clamping member 218 has a curved bearing face 218a to bear against block 112. That facilitates shackling of columns that may not be quite aligned. The recessed spaces at C1 afford open access to the shackling means. Clamping members 216, 218 may be attached, as by loose chains 222, to the container walls, to be handy for use; the bolt being hung in one of the clamping members to be also handy. As here shown, clamping member 216 is slotted so that, on backing off the nuts, it may be pulled out upwardly. 212 and 212a are small enough to be then removed by pulling through openings 214.

The wall recessing also facilitates shackling together containers that abut longitudinally, such as shown at A and B in FIGS. 3a and 3b. An instance of such shackling is shown diagrammatically in FIG. 20b. In that figure two such juxtaposed columns 80 and 82 are indicated, with the recessed spaces C1 at their inner sides. Such columns can be shackled in alignment by such a simple means as two clamping plates 230 drawn together by bolts 232 that extend through column openings 114; the spaces C1 affording access to the plates and bolts. The same access is available if two such columns 80, 82 are to be drawn together by any suitable means hooking into openings 114.

FIG. 24 shows how the forks 250 of a fork lift or truck enter the openings 90 under the floor structure. FIG. 25 shows a typical container picked up and carried by a straddle carrier. For that purpose the medial portion of the lower edges of the longitudinal side walls 100, between the columnar structures 80 and 82, may be undercut as shown at 252 (in dotted lines in FIG. 2) to accommodate the lower flanges of the pick-up angle 254 of the carrier.

FIG. 26 shows how a container may be lifted and handled by any simple lifting gear, with cables 256 looped through or hooked into the upper (or the lower) column openings.

FIG. 27 schematically shows a "cell" such as may be used in the holds of freight vessels. As here shown, four vertical columns 260 of cruciform section, mounted on a deck 262 and held in parallel relation by known means present in plan, at each of the four corners of an enclosed rectangle, two angularly related vertical guide faces 264. The containers in a stack fit within those guide surfaces in the general manner indicated in FIG. 27, those guide surfaces, engaging, more or less closely, the columnar structures 80 and 82 of the containers. The guide surfaces contact essentially only the vertical surfaces of the columnar structures. FIG. 14 shows, in broken lines, the relation of such a cell column 260 and their flange surfaces 264 to one of the corner columns of a container. The external vertical surfaces of the container corners are perfectly smooth and devoid of all horizontal protuberances. Hence the containers slide without hindrance in the cell guides. And, as reference to FIG. 14 will immediately show, the open space C1 between an end wall, such as 52, and the plane P of a guide surface 204, leaves the open space C1 for entry of handling and hoisting elements such as the hoist spreader 198 of FIGS. 21 and 21a, or the corresponding elements of the handling bridle of FIGS. 29 and following, as will be described.

FIGS. 29 and following show a preferred design of a handling bridle, such as that shown schematically at K in FIG. 27.

As shown in those figures a rectangular main frame, of shape and size, in plan, corresponding to a container, is made up of longitudinal beams 300, transverse end beams 302, and intermediate transverse beams and bracings 304 and 306. The frame and its carried mechanisms may be handled in any known manner; suspension cables are shown at 308, as an example.

A central longitudinal operating shaft 310 is mounted at its ends in bearings 312 under the end beams 302 (see FIG. 32), and at each end this shaft carries a mechanism J that, by shaft rotation in opposite directions, throws and retracts the four bolts 314. These bolts slide horizontally transversely of the frame in blocks 316 which depend from the four corners of the frame in the locations indicated in FIGS. 29 and 30.

Mechanism J is substantially the same at both ends of shaft 310; that at the left hand end of FIG. 29 is shown in FIG. 30 and in detail in FIGS. 31 to 37. In each mechanism J, shaft 310 carries a rigidly attached double-throw crank arm 320 to the opposite ends of which are connected one of the ends of links 322 whose other ends are connected at 324 with the upper ends of levers 326 mounted on pivots 328 which are carried on a sub-framing 330 depending from end frame member 302 (see FIGS. 30 and 34). The lower ends of levers 326 are connected by links 332 with the two bolts 314 which are located at the corners of that end of the frame.

Shaft 310 is controllably rotated through a limited angle in opposite directions, either by a manual handle 340 rigidly attached to the shaft in any convenient location, or by power actuation applied to the shaft preferably through one of the mechanisms J. As shown in FIGS. 31-33 a two-element rocker arm 342 is pinned at 321 to the lower end of crank arm 320 and is releasably connected to the upper part of that crank arm by the removable pin 344. That connecting pin may be held in place by any suitable releasable means and is provided with a handle piece 346 for convenience in pulling it out. The upper bridging member 348 of the two-part rocker arm 342 carries a lug 350 to which the operating rod 352 of a hydraulic cylinder 354 is connected. Reciprocation of the piston in that cylinder rotates shaft 310 back and forth through a limited angle to project and retract the four bolts 314 when connecting pin 344 is in place. If it is desired to manually operate the bolts by handle 340, pin 344 is removed to disconnect the power actuation. The rotational throw of rocker arm 342 may be limited in each direction by suitable stop means, so that removable pin 344 is not jammed by the fact that the parts (bolts 314, etc.) connected to lever 320 may be forced to stops at the ends of their movements. Pin 344 is thus always easily removable to free the mechanism from hydraulic cylinder 354 for manual operation by handle 340.

It will be understood that the spacing of the bolt blocks 316 longitudinally of the bridle frame is such that the blocks will drop down at the end of a container, in the spaces that have been referred to as C1, in positions between the two columns at each end. As shown in FIG. 30, the effective over-all length of the spreader formed by the bolt blocks and their framing is such as to enter the space between the two opposed columns. And FIG. 34 shows how the depending bolt blocks are contained within the space referred to as C1, between the planes 52b of the wall and that of the outer faces of columns 82. For purposes of general designation the bolster 180 of FIG.

21a, and the frame and bolt block structure of FIGS. 30 etc., as well as the spreader 198 of FIG. 21a, may be termed spreaders or spreader structures. FIG. 34 shows one bolt block 316 in such a position with relation to the end-recessed surface 52b of a container A, and with relation to a corner column 82. FIG. 30 shows the relation of two of the bolt blocks 316 and bolts 314 as they lie between two opposed columns, say 82, at one end of the container A, and with the bolts projected. In the position of the bridle frame shown in FIG. 30, resting on the upper surface of the container, the bolts 314 are at a level, with relation to the column apertures 114, such as shown in FIG. 30 and at larger scale in FIG. 36. In that relative position the bolts are projectible and retractible through the column openings 114. The bolts having been projected to the positions shown in those figures, a slight elevation of the bridle frame then raises the projected bolts in the openings 114 to the position shown in FIG. 37. In that position an upwardly extended lip 360 moves up in position, preferably with clearance as shown, outside the surface 118 of the column block 112, to lock the bolts in projected position until the bridle is lowered onto the container. The bolts are thus locked in projected position, engaging the corner columns as long as the container is being supported by the bridle.

It is to be noted that the outwardly projected and locked positions of the bolts are always visible outside of the container surface. That is also true of such bolts as are shown in FIGS. 21 and 21a where the bolts are also projected outwardly through the column openings. A visual check is thus afforded.

The system involves further controls. At each corner of the bridle frame there is a feeler and control pin 364 that is spring pressed to normally project its lower pointed end 366 below the plane of the lower face of the bridle frame; that plane being indicated at P in FIGS. 30 and 38. On lowering the bridle frame onto a container, the pointed ends of the pins, penetrating any foreign matter such as snow, etc., contact the container top. If then the bridle frame is lowered into contact with the container top at all four corners, all four pins are pushed up to the position shown in broken lines in FIG. 38. Each pin reaching that upper position actuates a snap micro-switch 368 to close it. In any position substantially below that upper position, the pin actuates its switch to open position. Thus, as will be pointed out, the bridle frame must be resting at all four corners on the container in order to close all four of those switches 368 in series in a circuit that controls motor actuation of the four bolts 314. Those bolts, as shown in FIGS. 30 and 36, are in elevational positions to be either projected through or withdrawn from the column openings 114. In any position of the bridle frame substantially above that shown in those figures, one or more of switches 368 will be open and the bolts cannot be motor-actuated.

FIG. 41 shows schematically the driving connection between a reversible electric motor 378 and the operating shaft 310 and also two limit switches 380 and 381 actuated by shaft 310 through striker arms 382. Piston 355 of hydraulic cylinder 354 is schematically shown connected to shaft 310. Reversible motor 378 drives hydraulic pump 384 in opposite directions to pump fluid in either of two directions between the ends of cylinder 354 to rotate shaft 310 in opposite directions. Assume, in FIG. 41 that the arrow indicates the direction of rotation for projecting the bolts 314.

The two limit switches 380 and 381 normally engage their contacts 380a and 381a (FIG. 40). Switch 380 is thrown to position engaging its contact 380b when shaft 310 reaches its limiting position, in the direction of the arrow, when the bolts are fully projected. Switch 381 is thrown to position engaging its contact 381b when shaft 310 reaches its limiting position, in the opposite direction, when the bolts are fully retracted.

In FIG. 40, 390 and 392 are standard motor reversing relays whose control switches are connected on one side with line 394 leading from one side of the power supply at 396. The other sides of their control switches are connected to motor 378 at one side, the other side of the motor being connected by 396 to the other side of the power supply. The known relay control system operates to connect the motor for rotation in opposite directions when one or the other of relays 390 or 392 is energized. The energizing circuit for relay 390 leads from the last mentioned side (here indicated as minus) of the power supply, through double throw manual switch 398, its contact 400, conductor 402, thence from the relay via 404 to contact 380a of limit switch 380, and from that switch to line 394 via the four switches 368 which, in series, control the circuit connection to 394 at the other (plus) side of the power supply. The energizing circuit for relay 392 leads from contact 406 of the manual control switch 398, via 408, and then from the relay via 410 to contact 381a of limit switch 381, thence from that switch via 412 and through the four control switches 368 to the other (plus) side of the power supply.

Switch contacts 380b and 381b of limit switches 380 and 381 are connected via 414 and 416 and signal lamps 418 and 420 with the minus side of the power supply.

Assume that the system is in its position where the bolts 314 are fully retracted. In that position switch 381 is thrown to engage its contact 381a while switch 380 is in its normal position engaging its contact 380a. Upon closure of all four control switches 368, the manual throwing of control switch 398 to engage its contact 400 will energize relay 390 to energize motor 378 to operate pump 384 in the direction to rotate operating shaft 310 to project the four bolts 314. Upon reaching its full bolt-projecting position, shaft striker 382 shifts switch 380 to engage its contact 380b, thereby breaking the relay energizing connection 404 and causing de-energization of motor 378, and at the same time closing the circuit of signal lamp 418. If manual control switch 398 is still held in engagement with contact 400 the bolt operating system remains stationary with the bolts projected.

Now, assume that, with the four control switches 368 still closed by the fact of the bridle frame resting on the container, if manual control switch 398 is thrown to engage contact 406, then relay 392 is energized via 408 and through 410 and contact 381a of limit switch 381. Energization of that relay energizes motor 378 to drive pump 384 in the direction to retract the four bolts 314. Immediately on starting movement in that direction, switch 380 moves from its signal contact 380b to its motor energizing contact 380a; and at the end of the bolt retracting movement, switch 381 is thrown from its motor energizing contact 381a to its signal contact 381b, stopping the motor and energizing signal lamp 420.

If, after projecting the four bolts 314, the bridle is lifted to such a position as shown in FIG. 30, to lift the container (a distance here designed to be about one-half inch) projection of any one or more of pins 364 opens one or more of switches 368. That completely opens the motor energizing circuit so that manual operation of control switch 398 cannot cause attempted retraction of the bolts. The bridle must be down on the container with the bolts in the relative positions shown in FIGS. 30 and 36, in order to energize the operating motor to move the bolts in either direction.

Manual control switch 398 is of the type that tends to return to neutral, and must be manually held in engagement with either of its contacts.

In the diagram of FIG. 40, all parts to the left of line 420 are located on the bridle of FIGS. 29, 30. All the parts to the right of line 422, together with the usual fuses, etc., are preferably mounted in a control box. That control box may be mounted on the bridle; or in, e.g., the control cab of a crane of any type or on a stationary platform or a ship's deck. In such latter mountings the parts of the several conductors between 420 and 422 in the diagram will be in the form of a cable of suitable length in some cases wound on a take up reel such as shown at 424 in FIG. 29 on the bridle.

Guiding members such as shown at 426 in FIGS. 29 and 39 may be mounted on the bridle to guide it down over a container. As shown in FIG. 39 these may be pivotally mounted at 428 and held in their guiding position, there shown, by pins 430. When not in use they may be swung up to the positions shown in broken lines.

In the following claims, container engaging means is intended to include means for engaging a container for any purpose, such for example, as holding it stationary or for lifting and/or moving.

The member or holding member that is adapted to enter the space between pairs of columns may or may not be in itself continuous between its ends, as has been explained in connection with the bolsters of FIGS. 21 and 21a. Their effective lengths are the lengths between their outer ends. And the same is true, for example, of the pairs of bolt-blocks on the bridle frame of FIGS. 29 and following. Those blocks, together with their interframing, may be regarded as a member or holding member adapted in length and size to enter the space between columns.

We claim:

1. A container adapted for transfer between various carriers, said container embodying in combination a bottom floor structure, a pair of opposite wall structures permanently associated with and rising from the floor structure, two pairs of vertical columnar structures permanently secured to and rising from the floor structure and each of said columnar pairs being permanently and securely associated respectively with each of the opposite wall structures of the wall pair at predetermined positions relative to the wall structure, the wall structures being horizontally continuous between the associated columnar structures and of vertical height substantially co-terminous with said columnar structures, the columnar structures of each wall-associated pair being spaced apart horizontally and having at least portions at one vertical end in substantially horizontal opposition which project outwardly of the wall structure to a vertical plane spaced outwardly of the vertical plane of the outer face of at least a vertical terminal plane portion of the associated wall structure, so that open spaces are left extending horizontally continuously between the said projecting portions of the pairs of columnar structures and between the planes of the outer faces of said wall structure portions and of the said projecting columnar portions, said spaces being unobstructively open and accessible vertically from at least one vertical end thereof, and engageable means presenting substantially horizontal, vertically engageable surfaces, in mutually substantially horizontal opposition, associated with the mutually opposed faces of the pairs of projecting columnar structure portions, said engageable means being located on the columnar structures and between said vertical planes so as to be engageable by engaging means entered vertically into said spaces between said projecting column portions.

2. The combination defined in claim 1, and in which the projecting columnar portions project outwardly beyond at least an upper terminal portion of the associated wall structure.

3. The combination defined in claim 1, and in which the projecting columnar portions project outwardly beyond at least an upper and a lower terminal portion of the associated wall structure and in which said spaces are unobstructively open and accessible at both top and bottom sides of the container.

4. The combination defined in claim 1 and in which the projecting columnar portions project outwardly beyond portions of the associated wall structures extending from top to bottom of said wall structures and in which said spaces extend unobstructively from top to bottom of the wall structure and are open and accessible at both top and bottom side of the container.

5. The combination comprising:

a container embodying in combination a bottom floor structure, a pair of opposite wall structures permanently associated with and rising from the floor structure, two pairs of vertical columnar structures permanently secured to and rising from the floor structure and each of said columnar pairs being permanently and securely associated respectively with each of the opposite wall structures of the wall pair at predetermined positions relative to the wall structure, the wall structures being horizontally continuous between the associated columnar structures and of vertical height substantially co-terminous with said columnar structures, the columnar structures of each wall-associated pair being spaced apart horizontally and having substantially at least at one vertical end portions in substantially horizontal opposition which project outwardly of at least the adjacent vertically terminal portion of the wall structure to a vertical plane space outwardly of the vertical plane of the outer face of said vertically terminal plane portion of the associated wall structure, so that open spaces are left located between and adjoining each of said projecting portions of the pairs of columnar structures and between the planes of the outer faces of said wall structure portions and of the said projecting columnar portions, said spaces being unobstructively open and accessible vertically from at least one vertical end thereof, and engageable means presenting substantially horizontal, vertically engageable surfaces, in mutually substantially horizontal opposition, associated with the mutually opposed faces of the pairs of projecting columnar structure portions, said engageable means being located on the columnar structures and between said vertical planes so as to be engageable by engaging means entered vertically into said spaces between said projecting column portions; a spreader structure having an effective horizontal length between ends not more than the horizontal spacing between a pair of said projecting columnar structure portions and being of effective cross-sectional size adapted by relative vertical movement to enter and be contained within one of said defined open spaces; horizontally projectible and retractible engaging elements carried by the end portions of said spreader structure; and means for positively and forcibly projecting said engaging elements horizontally away from each other to positions to be vertically engageable with said horizontal engageable surfaces associated with said projecting columnar structure portions.

6. The combination as in claim 5 in which the projecting columnar portions project outwardly beyond only a vertical terminal portion of the associated wall structures, said open spaces being unobstructively open and accessible vertically from a vertical end.

7. The combination as in claim 5 in which the engageable surfaces of the columnar structures are formed by the walls of substantially horizontal openings extending through said columnar portions from their mutually opposed faces to their respectively opposite faces.

8. The combination comprising:

a container adapted for transfer between various carriers, said container embodying in combination a bottom floor structure, a pair of opposite wall structures permanently associated with and rising from the floor structure, two pairs of vertical columnar structures permanently secured to and rising from the floor structure and each of said columnar pairs being permanently and securely associated respectively with each of the opposite wall structures of the wall pair at predetermined positions relative to the wall structure, the wall structures being horizontally continuous between the associated columnar structures and of vertical height substantially coterminous with said columnar structures, the columnar structures of each wall-associated pair being spaced apart horizontally and having substantially at least at one vertical end portions in substantially horizontal opposition which project outwardly of at least the vertical plane of the outer face of a vertically terminal plane portion of the associated wall structure, so that open spaces are left located between and adjoining each of said projecting portions of the pairs of columnar structures and between the planes of the outer faces of said wall structure portions and of the said projecting columnar portions, said spaces being unobstructively open and accessible vertically from at least one vertical end thereof, and engageable means presenting substantially horizontal, vertically engageable surfaces, in mutually substantially horizontal opposition, associated with the mutually opposed faces of, and carried by, the pairs of projecting columnar structure portions, said engageable means being located between said vertical planes so as to be engageable by engaging means entered vertically into said spaces between said projecting column portions; a rigid bridle frame structure carrying a pair of horizontally extending container engaging spreader structures, each of said spreader structures depending from the frame and having an effective horizontal length between ends not more than the lateral spacing between a pair of columnar structures and being of effective cross-sectional size adapted to enter said open spaces, and said two spreader structures being spaced normally of their lengths so that by relative vertical movement they may simultaneously enter the said open spaces at each of the said opposite wall structures associated with the columnar structures; horizontally projectible and retractible locking elements carried by the end portions of the spreader structures adapted when projected horizontally to engage by relative vertical movement of the bridle frame with the engageable surfaces of the columnar structures; and means for positively and forcibly projecting said locking elements.

9. The combination as in claim 8 and in which said bridle structure has a lower surface adapted to be lowered onto an upper surface of the container, and in which said projectible locking elements are located in a horizontal plane below said lower bridle surface so as to be located below said engageable surfaces of the columnar structures when the bridle structure is lowered onto the container and when the locking elements are extended.

10. The combination of claim 8 in which the means for projecting said locking elements is a single operating means carried by the frame structure.

11. The combination defined in claim 8 that also includes power operated means for projecting and retracting the said locking means, and a control system for controlling energization of the power operated means including vertically movable control members normally depending below said rigid bridle frame and adapted to be moved upwardly relative to said frame by contact with an upper surface of the container.

12. The combination comprising:
a container adapted for transfer between various carriers, said container embodying in combination a bottom floor structure, a pair of opposite wall structures associated with and rising from the floor structure, two pairs of vertical columnar structures secured to and rising from the floor structure and each of said columnar pairs being securely associated respectively with each of the opposite wall structures of the wall pair, the columnar structures of each wall-associated pair being spaced apart horizontally and having at least portions in substantially horizontal opposition which project outwardly of the wall structure to a vertical plane spaced outwardly of the vertical plane of the outer face of at least a vertically terminal portion of the associated wall structure, so that open spaces are left between the projecting portions of the pairs of columnar structures and between the planes of the outer surfaces of said wall structure portions and of the projecting columnar portions, and lock engageable means in the form of structured openings extending through the columnar structures from the defined open spaces through the opposite faces of said columnar structures, said opening structures having upper load-bearing walls presenting substantially horizontal, vertically engageable surfaces and vertical faces at the said opposite column faces extending up from the load-bearing wall, said engageable surfaces being in mutually substantially horizontal opposition and associated with the mutually opposed faces of the pairs of projecting columnar structures, said lock engageable means being located in the columnar structures between said vertical planes so as to be engageable by engaging means entered into said spaces between said projecting column portions;
a rigid bridle frame structure carrying a pair of horizontally extending container engaging spreader structures, each of said spreader structures depending from the frame and having an effective horizontal length between ends not more than the lateral spacing between a pair of columnar structures and being of effective cross-sectional size adapted to enter said open spaces, and said two spreader structures being spaced normally of their lengths so that by relative vertical movement of the bridle frame they may simultaneously enter the said open spaces at each of the said opposite wall structures associated with the columnar structures;
horizontally projectible and retractible locking elements carried by the end portions of the spreader structures in the form of reciprocable bolts adapted to be projected through said column openings and having upwardly projecting lips at their outer ends adapted to be raised by bridle raising into positions outside of the vertical faces of the columnar opening structures to prevent retraction of the bolts, said bolts when projected horizontally engaging by relative vertical movement of the bridle frame the engageable surfaces of the columnar structures;
power operated means for positively and forcibly projecting and retracting the locking bolts;
and a control system for controlling energization of the power operated means including vertically movable control members normally depending below the bridle frame adapted to be moved upwardly relative to said frame by contact with an upper surface of the container, said control members acting to prohibit energization of the power operated means when the bridle frame is above its container engaging position to prevent the projection of the locking bolts to the relative position where their outer lips are above the level of the upper load-bearing wall of the columnar openings.

13. An engaging and lifting bridle for topped containers of the character described, said bridle comprising a rigid bridle frame structure adapted to be translated vertically and horizontally, said frame structure being generally rectangular in plan and of dimensions in plan commensurate with the plan dimensions of such container, and its bottom face in an unobstructed normally horizontal plane adapted to be lowered onto the top of such container, said frame structure carrying at each of two opposite edge portions a depending horizontally extending spreader structure, each of said spreader structures having an effective horizontal length between ends, and an effective cross-section of pre-determined dimensions relative to the dimensions of such container, and said two spreader structures being spaced normally of their lengths, horizontally projectible and retractible locking means carried by the end portions of the spreader structures, power operated means carried by the bridle frame for simultaneously and positively projecting and retracting all said locking means, and a control system for controlling energization of the power operated means including a plurality of vertically movable control members normally depending in horizontally spaced positions below the bottom plane of said rigid bridle frame and adapted to be moved upwardly relative to said frame by contact with the top surface of the container, and an energizing circuit for said power operated means adapted to be closed by virtue of all said control members being moved upwardly to positions at a predetermined height above said projectible locking means to thereby actuate said locking means.

References Cited in the file of this patent

UNITED STATES PATENTS

| | | |
|---|---|---|
| 1,050,578 | Tucker | Jan. 14, 1913 |
| 1,717,006 | Cartwright | June 11, 1929 |
| 1,879,756 | Kuchta | Sept. 27, 1932 |
| 1,940,242 | Burgess | Dec. 19, 1933 |
| 2,047,139 | Fildes | July 7, 1936 |
| 2,047,141 | Fildes | July 7, 1936 |
| 2,053,969 | Olds | Sept. 8, 1936 |
| 2,457,842 | Smith et al. | Jan. 4, 1949 |
| 2,525,388 | Willetts | Oct. 10, 1950 |
| 2,547,502 | Smith et al. | Apr. 3, 1951 |
| 2,869,750 | Doerr et al. | Jan. 20, 1959 |
| 2,919,826 | Richter | Jan. 5, 1960 |
| 2,920,917 | Sheehan | Jan. 12, 1960 |
| 3,015,407 | Fesmire et al. | Jan. 2, 1962 |
| 3,042,227 | Tantlinger | July 3, 1962 |

UNITED STATES PATENT OFFICE
CERTIFICATE OF CORRECTION

Patent No. 3,081,120              March 12, 1963

Percival M. Heinmiller et al.

It is hereby certified that error appears in the above numbered patent requiring correction and that the said Letters Patent should read as corrected below.

Column 13, line 46, for "vertical" read -- vertically --.

Signed and sealed this 8th day of October 1963.

(SEAL)
Attest:

ERNEST W. SWIDER            EDWIN L. REYNOLDS
Attesting Officer            Acting Commissioner of Patents